Jan. 19, 1926.  1,570,523
R. H. L. PENNELL
FILTRATION OF WATER OR LIQUID
Filed April 24, 1922    3 Sheets-Sheet 1

Inventor
Reginald H. L. Pennell
By James L. Norris
Attorney

Jan. 19, 1926.
R. H. L. PENNELL
1,570,523
FILTRATION OF WATER OR LIQUID
Filed April 24, 1922    3 Sheets-Sheet 2
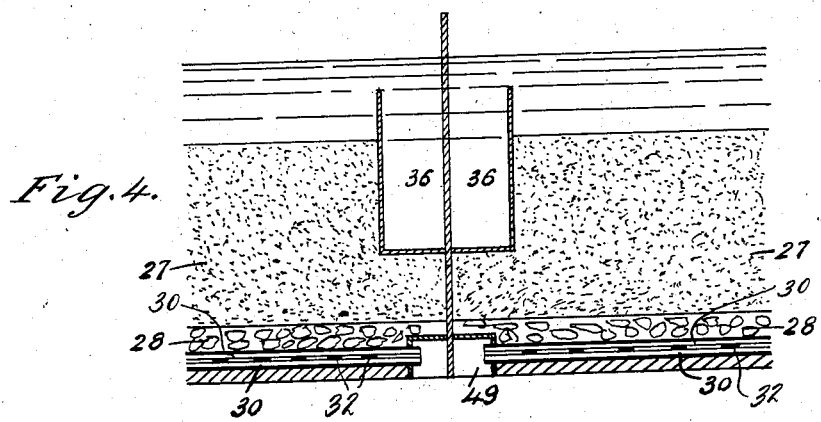
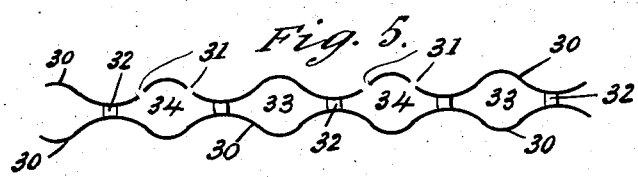
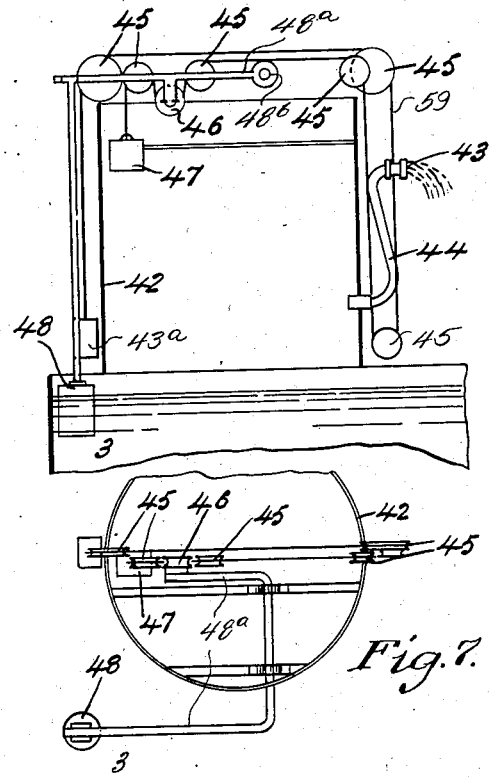
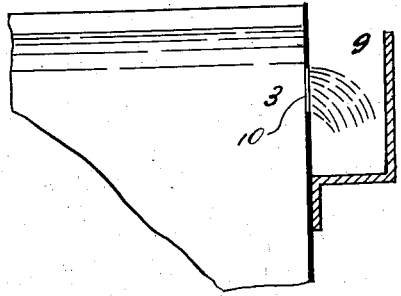

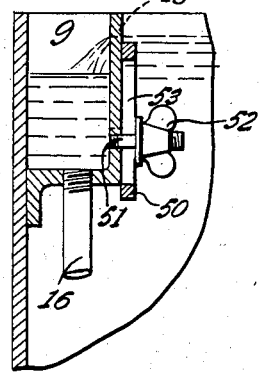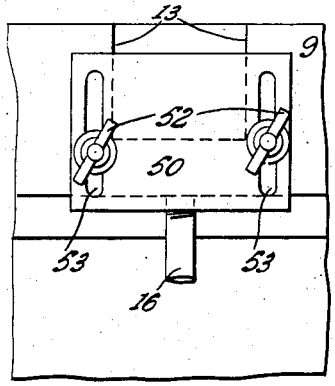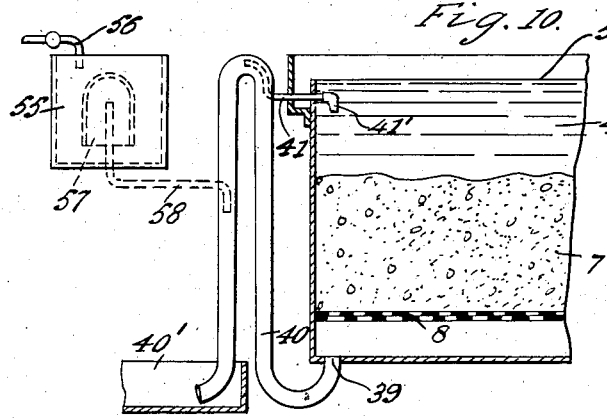

Patented Jan. 19, 1926.

1,570,523

UNITED STATES PATENT OFFICE.

REGINALD HUMPHREY LEE PENNELL, OF CAIRO, EGYPT.

FILTRATION OF WATER OR LIQUID.

Application filed April 24, 1922. Serial No. 556,222.

*To all whom it may concern:*

Be it known that I, REGINALD HUMPHREY LEE PENNELL, a subject of the King of Great Britain, residing in Cairo, Egypt, have invented certain new and useful Improvements in or Relating to the Filtration of Water or Liquid, of which the following is a specification.

This invention consists in an improved method of and plant for purifying or filtering water or liquid, the plant being particularly suitable for dealing with the water supplies to small towns. By means of the invention a filter effluent equal in purification to that afforded by known rapid filter plants is obtained, but at a very much reduced initial cost; and all working arrangements are simplified to such an extent that the plant can be operated, under semi-skilled supervision.

According to the invention improved prefilters are used in place of the usual settling tanks, and the whole system of purification is combined within one plant unit. Prefiltration is carried out to such an extent that partial purification is obtained and complete clarification effected before the water or liquid reaches a sand filtering medium for final filtration and without recourse being had to the usual large settling tanks. Improved arrangements are provided in connection with the admission of the crude water, for the admission of alum or other precipitant, whereby the amount of the precipitant supplied varies automatically in quantity with all changes of quantity in the liquid being filtered; and in the clarification of the water which is effected by reduction in velocity as well as by grading the medium in the prefilters, improved means being provided for washing the prefilters. In the improved plant the filteration is carried out in stages, the liquid passing with a decreasing rate of flow through one or more chambers which may be divided into compartments containing graded filtering medium before reaching a filtered liquid reservoir or tank.

Although the plan of the improved plant may be of any configuration, it will usually be found preferable to make it either circular or rectangular.

The invention will be described with reference to the accompanying drawings, in which one form of the improved plant shown as circular in plan, is illustrated, and in which:—

Fig. 4 shows a detail section on the line 4—4, Fig. 1.

Fig. 5 is a detail view of a false floor formed of corrugated iron sheets, and

Fig. 6 and Fig. 7 are, respectively, a sectional elevation and a plan of a device for feeding a precipitant to the liquid to be filtered.

Fig. 8 is a detail cross section, to an enlarged scale, through an inlet opening to a distributing channel and showing an adjustable shutter. Fig. 9 is an elevation of the parts shown in Fig. 8, and Fig. 10 is a detail vertical section on the line 10—10 in Fig. 1, showing a wash-out siphon and a controlling flushing tank drawn to an enlarged scale.

Figure 1:
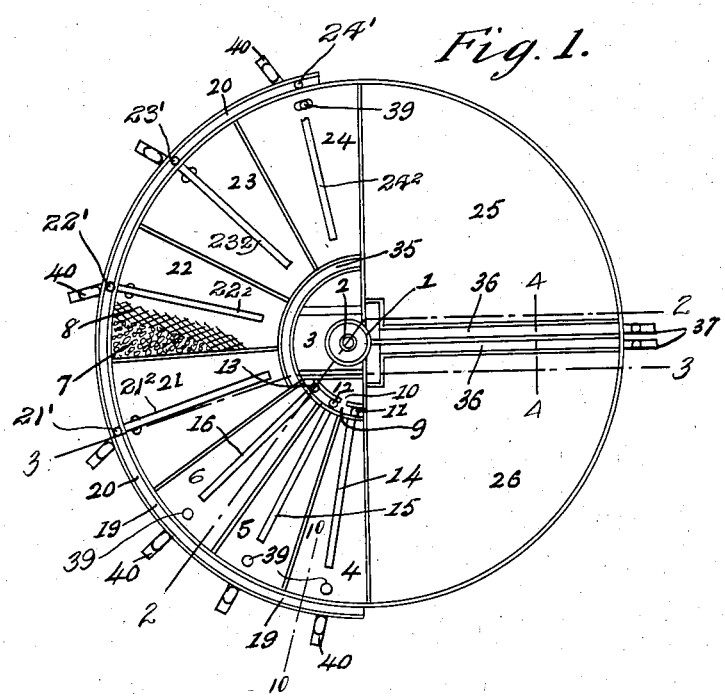
Fig. 1 is a plan view.
Figure 2:
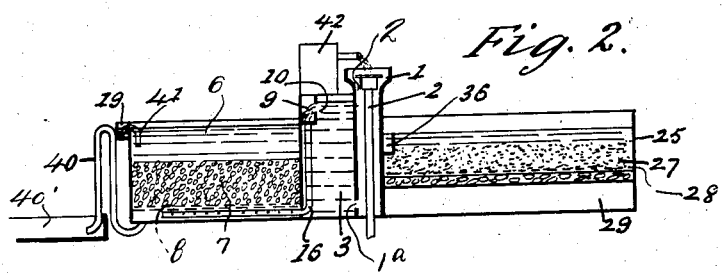
Fig. 2 is a vertical section on the line 2—2 in Fig. 1.
Figure 3:
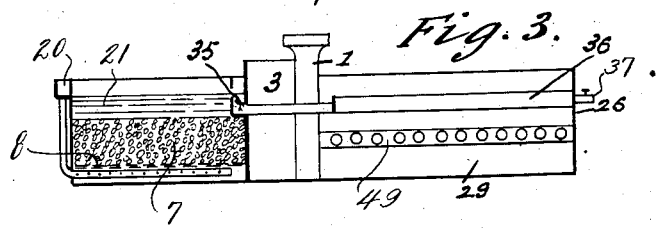
Fig. 3 is a section on the line 3—3, Fig. 1.

The terms "scrubber" and "strainer" are used to imply chambers containing coarse and fine clarifying mediums respectively, which may be varied to suit the nature of the liquid. The area of the strainer chambers is greater than that of the scrubber chambers.

In the drawings, 1 is a centrally disposed well into which, in the first stage of filtration, the water or liquid to be filtered is led through an annular venturi or other suitably shaped orifice 2' by means of a pipe 2, the water leaving by one or more openings 1ª at or near the bottom of the well and passing upwardly through a catch pit or tranquilizing chamber 3 wherein foreign matter is arrested. The catch pit may be provided with an overflow and also with a wash-out outlet, which are not shown.

In the second stage of filtration one or more scrubbers are used, each scrubber being composed of one or more separate compartments in order to facilitate washing as hereinafter described. In the example illustrated, there is shown one scrubber which is divided into three separate compartments 4, 5 and 6 which work in parallel.

The scrubber contains gravel 7 resting on a false floor 8 in the scrubber compartment, the floor being of any suitable construction and dividing the scrubber compartment into two parts, an upper one and a lower one.

The false floors may, for instance, be constructed of layers of expanded metal or wire mesh resting on joists, the meshes intersecting in plan so that the size of the openings are reduced to any degree required by increasing the number of layers.

The water is led from the catch pit 3 through a circular orifice 10 into the channel 9. From this channel it passes through openings 11, 12 and 13 into pipes 14, 15 and 16, which respectively convey it into the space below the false floors of the three compartments 4, 5, and 6, the portions of the pipes below the floors being perforated.

The flow through the openings 11, 12 and 13, is controlled by means of adjustable shutters or weirs 50, one of which is shown in Figs. 8 and 9. The shutters 50 are adjusted in position relatively to the openings 11, 12, 13 by means of the threaded members and nuts 51, 52, the said members being fixed to the wall of the channel 9 and projecting through slots 53 in the shutters 50. The shutters are normally set so as to give an equal discharge of water over each one, but can be set so as to completely close the water off any one compartment. Thus normally one third of the flow passes into each of the three compartments, rises through the gravel, and flows into the effluent channel 19.

In the next stage the water passes through one or more strainers, the effluent channel 19 from the scrubbers being continued as the inlet channel 20 to the strainers. Each strainer is supplied with a filtering medium of fine gravel, coarse sand, or otherwise, resting on a false floor which may be like those described for the scrubbers. The effluent passes to the strainers from the scrubbers as described, and the strainers function similarly to the scrubbers, the inlet thereto being controlled by shutters.

The drawing shows one strainer divided into four compartments 21, 22, 23 and 24, each compartment taking one fourth of the total flow, the compartments to work in parallel. The water flowing from the effluent channel 19 into its extension channel 20 passes through openings 21', 22', 23', and 24' in the latter channel into the pipes 21², 22², 23² and 24², which, respectively, convey it into the space below the false floors of the said compartments, the portions of the pipes below the floors being perforated.

The strainers and scrubbers are, preferably, divided as described in order to facilitate washing, in the manner to be explained hereafter.

If there be only one strainer this is of considerably larger area in plan than the preceding scrubber, and, where there is more than one strainer, the final strainer is larger in plan than the next preceding strainer which in turn is larger than the strainer preceding it. Similarly if there be more than one scrubber the final scrubber is larger than the next preceding scrubber which is larger than the scrubber preceding it. The filtering medium in both scrubbers and strainers may be of the same size, and further clarification obtained by the strainers may be entirely accomplished by the reduced velocity of flow afforded by their larger size.

Any compartment or number of compartments may be cut out of action by closing the inlet shutters, and also when the level of the water falls in any compartment below the sill of the effluent channel, which occurs during washing operations, the compartment in question contributes no water to the general effluent until the water in said compartment has risen to overflow again into the effluent channel. The compartments are for the purpose of facilitating the washing of the filtering medium, which can be washed separately without interfering with the functioning of the rest of the plant. As each compartment is of small size, very thorough raking of the gravel is rendered possible when necessary.

The catch pit, the scrubbers, and the strainers in the improved plant correspond with the settling tanks in known filter plants.

The last filtering stage consists of sand filtration, two tanks 25 and 26 working in parallel being preferably employed. The water is admitted from the strainer compartments by means of the effluent channel 35, to the sand filter inlet channel 36 from which it overflows on to the upper surface of the sand 27 which constitutes the filtering medium in these tanks. The water passes downwardly through the sand 27 and gravel 28 on to the false floor 30 to be described in detail hereinafter and by which it is collected and discharged into conduit 49 and from which conduit 49 it passes through a known filter effluent control apparatus into the filtered water reservoir 29.

The filter floor of a filtering tank may consist of galvanized corrugated iron sheets 30, arranged as shown in Fig. 5, the upper sheets being perforated in every alternate corrugation at suitable points 31. Short distance pieces 32, suitably spaced apart, may be interposed between the layers of sheets so that two series of conduits 33 and 34 are thus formed, one series serving as a pressure conductor and the other as a diffuser for wash water.

At one end these conduits are closed and at the other end every alternate conduit is connected with the distributing conduit 49, having passages or apertures opposite every alternate corrugation in the sheets. The water enters the filters, as already stated, by overflowing from channel 36. It descends through the filtering medium, enters the conduits 34 through the holes 31 in the sheets 30 and passes by means of the small passages between the sheets, which are kept apart for the purpose by the distance pieces 32, into the adjacent conduits 33 which are in communication with the distributing conduit 49, which in turn carries the water to the filter control and so into the filtered water reservoir.

When it is required to wash the filtering sand filtered-water is pumped under pressure into the distributing conduit 49, and the above operation is repeated in the reverse direction, the water issuing through the perforations 31 and rising through the sand washes it. The sand may be raked at the same time, the wash-water escaping by flowing into channels 36 and away through pipes 37 controlled by valves. The sheets being very close together, the water passage between them is small as compared with the area of water passage in conduits 33. Water therefore discharges fairly evenly along the whole length of the small passages or orifices between the sheets. Conduits 34 further act as pressure diffusion chambers and the discharge from the perforation 31 in conduit 34 is thereby equalized over all the perforations along the entire length of the conduit. The quantity of wash water leaving the conduits 34 and going into the filter is thus automatically regulated to a fairly even distribution all over the filter.

The sediment which collects below the false floors of the scrubbing and straining compartments, and also that in the lower portions of the filtering mediums therein may be removed by wash-out outlets 39 provided at the bottom of each compartment and connected to a wash-out siphon 40. The siphons may be arranged to discharge into a common outlet pipe or duct 40'. The top of a siphon may, as shown in Fig. 10, be just above the water level 54 in the compartment which it serves. A small flushing tank 55 may discharge its contents into the descending leg of the siphon thus starting siphonic action. A small pipe 41 with a bend at the end may connect the rising leg of the siphon with the compartment it serves. When the water in the compartment siphons away during the washing operation and drops below the inlet 41' of pipe 41, air enters, the siphons unseals, and the flow ceases. The inlet bend 41² at the end of pipe 41 may be adapted to be turned round so that siphonic action may be stopped at any water level desired within the limits of the diameter of the circle which the bend describes when turned. The quantity of wash water used at each washing operation may be thus regulated. The small flushing tank which starts the main siphon may be filled in any convenient manner, for instance, by means of a drip cock 56 and may be of the form of an ordinary urinal siphonic flush tank in which are the bell 57 and discharge pipe 58 for flushing the water out quickly. The time taken to fill this small flushing tank with water determines the period between washings. The end of the descending leg of the siphon may be closed with a balanced valve to assist the flush water to start the siphon.

Alum or other precipitant in solution may also be added to the water in this design of filter in exact proportion to the amount of water being clarified. The vessel 42 containing the solution may, as shown in Fig. 6, discharge through a nozzle with a circular orifice 43, the nozzle being attached to a length of flexible tubing 44 connected to the side of the vessel near the bottom. The nozzle and tubing 44 are balanced by a weight 43ª attached to one end of a cord 59, which passes over suitable pulleys 45 and has its other end attached to a float 47 in vessel 42, the nozzle being carried within guides (not shown) by the cord 59. A jockey pulley 46 riding on the cord 59 is carried by a lever 48ª pivoted at 48ᵇ. The position of the lever, and therefore of the jockey pulley, is controlled by a float 48 on the water in the well 3 so that the pulley 46, which rises or falls with the water level in the well, causes the nozzle to fall or rise to the same extent. The position of the nozzle 43 in relation to the level of the solution in vessel 42 is regulated by the float 47.

As the discharge from the well into the effluent channel 9 is through a circular orifice 10 and the discharge from the alum tank is also through a circular orifice, the coefficient for discharge is the same in both cases; and since the hydrostatic head on the alum discharge nozzle is caused by the jockey pulley 46 and float 48 in the well 3 to vary with the hydrostatic head on the effluent orifice 10, the ratio of discharge between the water to be clarified and the precipitating solution is kept constant. The float 47 within the alum vessel may be so arranged that it causes the nozzle to slide up and down a guide as the surface level of the solution in the vessel varies. A constant discharge for all levels of solution in the alum vessel is thereby obtained; this discharge not being effected by the surface level of the solution in the alum vessel, but only by the surface level of the water to be clarified in well 3, this surface level being the index of the quantity entering the plant through the inlet pipe 1 and issuing from the well through orifice 10.

Means may be provided for indicating that one or other of the filtering compartments requires cleansing, and such means may consist of a number of ordinary glass or other transparent water gauges, one for each compartment. The interior of the gauges are, by means of conduits or tubing, placed in communication with the respective compartments. The gauges may, for convenience of inspection, be grouped together at some convenient spot. The water levels in the gauges indicate the hydraulic gradient throughout the plant. If any one filter compartment begins to get choked with sediment, the filter head increases correspondingly and the hydraulic gradient steepens in the corresponding gauge, thereby indicating that the said compartment requires cleansing.

To assist sedimentation in the catch pit, colloiders consisting of thin wooden battens may be suspended therein.

The plant may be constructed of any appropriate material or materials, such as stone, brick, or concrete, or it may be made substantially throughout of sheet iron or steel.

Having thus described the nature of the said invention and the best means I know of carrying the same into practical effect, I claim:—

1. Water or liquid filtering apparatus, comprising in combination a well having an inlet at its upper part for the admission of crude liquid and an outlet for liquid at its lower part, a catch-pit chamber communicating at its lower end with said outlet and having near its upper end a discharging orifice, a series of pre-filtering devices, said devices increasing in area successively and each comprising an upper and lower chamber, a foraminous false bottom separating the chambers, and a filtering medium carried by the false bottom, said medium being of a finer grade in successive devices, means for conducting liquid from said discharging orifice to the lower chamber of the first pre-filtering device in the series, means for conducting liquid in turn from the upper chamber of a pre-filtering device and discharging it into the lower chamber of the pre-filtering device next in series, a tank provided with a foraminous false floor, a sand filtering medium carried by the last said floor, means for withdrawing liquid from the upper chamber of the pre-filtering device last in the series and discharging same above the said sand filtering medium, means for collecting the liquid which percolates through the sand medium, and a filtered water reservoir in communication with said collecting means, substantially as described.

2. Water or liquid filtering apparatus, comprising, in combination, a well having an inlet at its upper part for the admission of crude liquid and an outlet for liquid at its lower part, a catch-pit chamber communicating at its lower end with said outlet and having a discharging orifice near its upper end, a series of pre-filtering devices successively increasing in area and comprising each an upper and lower chamber, a foraminous false bottom separating the chambers, and a filtering medium carried by the false bottom, said medium being of a finer grade in successive devices, means for conducting liquid from said discharging orifice to the lower chamber of the first pre-filtering device in the series, means for conducting liquid in turn from the upper chamber of a pre-filtering device and discharging it into the lower chamber of the pre-filtering device next in series, a tank provided with a foraminous false floor, a sand filtering medium carried by the last said floor, means for withdrawing liquid from the upper chamber of the pre-filtering device last in the series and discharging same above the said sand filtering medium, means for collecting the liquid which percolates through the sand medium, means for washing the said sand filtering medium, said means comprising in combination a series of perforated ducts below said medium, a series of subsidiary feeding ducts, communicating passages connecting the perforated and feeding ducts, said passages being each of small cross sectional area as compared with the cross sectional area of a feeding duct, a main duct communicating with a supply of washing liquid under pressure and with the feeding ducts, said main duct being of large cross sectional area compared with that of the feeding ducts, and a filtered water reservoir in communication with said collecting means, substantially as described.

3. Water or liquid filtering apparatus, comprising in combination a well having an inlet at its upper part for the admission of crude liquid and an outlet for liquid at its lower part, a catch-pit chamber communicating at its lower end with said outlet and having a discharging orifice adjacent its upper end, a series of pre-filtering devices, said devices increasing in area successively and comprising each an upper and lower chamber, a foraminous false bottom separating the chambers, and a filtering medium carried by the false bottom, said medium being of a finer grade in successive devices, means for conducting liquid from said discharging orifice to the lower chamber of the first pre-filtering device in the series, means for conducting liquid in turn from the upper chamber of a pre-filtering device and discharging it into the lower chamber of the pre-filtering device next in series, a tank provided with a foraminous false floor, said floor consisting of two series of intercommunicating conduits, one series being closed at both end and provided with a plurality of inlet openings, the other series being closed at one end and open at the other, a sand filtering medium carried by the last said floor, means for withdrawing liquid from the upper chamber of the pre-filtering device last in the series and discharging same above the said sand filtering medium, means for collecting the liquid which percolates through the sand medium, said means consisting of a distributing conduit communicating with the open end of the intercommunicating conduits, and a filtered water reservoir in communication with said distributing channel, substantially as described.

4. Water or liquid filtering apparatus according to claim 1, wherein the pre-filtering devices comprise a number of scrubbing compartments arranged in parallel and a number of straining compartments also arranged in parallel, each straining compartment having an area larger than the area of any scrubbing compartment.

5. Water or liquid filtering apparatus according to claim 1, wherein each pre-filtering device is divided into a number of compartments, each compartment comprising an upper chamber and a lower chamber, and a separate wash-out outlet device is arranged in each lower chamber and a wash-out siphon is connected to each outlet device.

6. Water or liquid filtering apparatus according to claim 1, having a wash-out outlet arranged at the bottom of the catch-pit chamber, a wash-out outlet provided in the lower chamber of each pre-filtering device, and an outlet duct common to all the wash-out outlets.

In testimony whereof I have signed my name to this specification.

REGINALD H. L. PENNELL.